United States Patent
Kühner et al.

(10) Patent No.: US 7,165,662 B2
(45) Date of Patent: Jan. 23, 2007

(54) MOBILE VEHICLE COMPRISING A FRICTION CLUTCH AND AN INCH PEDAL

(75) Inventors: Karl Kühner, Friedrichshafen (DE); Manfred Sieger, Friedrichshafen (DE); Norbert Sommer, Baienfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 100 days.

(21) Appl. No.: 10/523,320

(22) PCT Filed: Aug. 1, 2003

(86) PCT No.: PCT/EP03/08511

§ 371 (c)(1),
(2), (4) Date: Feb. 2, 2005

(87) PCT Pub. No.: WO2004/015293

PCT Pub. Date: Feb. 19, 2004

(65) Prior Publication Data

US 2005/0284719 A1 Dec. 29, 2005

(30) Foreign Application Priority Data

Aug. 7, 2002 (DE) .............................. 102 36 090

(51) Int. Cl.
F16D 48/02 (2006.01)
F16D 67/02 (2006.01)
(52) U.S. Cl. ................... 192/13 R; 192/30 W
(58) Field of Classification Search .................. None
See application file for complete search history.

(56) References Cited

U.S. PATENT DOCUMENTS 3,741,356 A * 6/1973 Sieren et al. .............. 192/3.61
3,855,875 A * 12/1974 Hansen ...................... 192/3.57
4,441,596 A * 4/1984 Nakahara et al. .......... 192/13 R
5,101,943 A 4/1992 Bulgrien
5,161,405 A * 11/1992 Macqueene .................... 701/3
5,509,520 A 4/1996 Evans et al.

(Continued)

FOREIGN PATENT DOCUMENTS

DE 195 21 458 A1 12/1995

(Continued)

OTHER PUBLICATIONS

Abstract for NEC Corp. publication No. 02095038 A; inventor: Sugihara Shigeru; date: Apr. 1990; (one page).*

(Continued)

Primary Examiner—Rodney H. Bonck
(74) Attorney, Agent, or Firm—Davis & Bujold, P.L.L.C.

(57) ABSTRACT

A mobile vehicle comprising a shiftable transmission with fixed gear ratio steps and a controllable friction clutch contains a distance sensor, which is connected to an inch pedal and in which the starting position and the end position of the inch pedal are adjusted by an electronic control unit and allocated to an inch effect from 0% to 100%. Due to the electronic adjusting process of the inch pedal path via the inch effect and the service brake, the intersecting time between the service brake and the actuating force of the clutch can be adjusted. The driving comfort of the vehicle is increased and the risk of damage to the multi-disk clutch is reduced.

6 Claims, 2 Drawing Sheets

U.S. PATENT DOCUMENTS

| | | | |
|---|---|---|---|
| 5,613,581 A * | 3/1997 | Fonkalsrud et al. | 192/3.23 |
| 6,038,858 A | 3/2000 | Mies | |
| 6,162,146 A * | 12/2000 | Hoefling | 477/73 |
| 6,371,885 B1 * | 4/2002 | Kobayashi et al. | 477/115 |
| 6,439,364 B1 | 8/2002 | Mies | |
| 6,471,022 B1 | 10/2002 | Goebel et al. | |
| 6,505,529 B1 | 1/2003 | Legner et al. | |
| 6,694,798 B1 | 2/2004 | Kühner et al. | |
| 2002/0038750 A1 | 4/2002 | Bulgrien | |
| 2003/0014172 A1 * | 1/2003 | Burgart et al. | 701/51 |

FOREIGN PATENT DOCUMENTS

| | | |
|---|---|---|
| DE | 198 15 889 A1 | 10/1999 |
| DE | 198 26 097 A1 | 12/1999 |
| DE | 198 30 950 A1 | 1/2000 |
| DE | 198 46 955 A1 | 4/2000 |
| EP | 0 207 525 A2 | 1/1987 |
| EP | 0 836 559 B1 | 8/1999 |
| JP | 02 095938 | 4/1990 |
| WO | WO-01/65227 A1 | 9/2001 |

OTHER PUBLICATIONS

Abstract for WIPO document No. WO 00/22323 A1; inventor: Legner et al.; date: Apr. 2000; (one page).*

* cited by examiner

MOBILE VEHICLE COMPRISING A FRICTION CLUTCH AND AN INCH PEDAL

This application is a national stage completion of PCT/EP2003/008511 filed Aug. 1, 2003 which claims priority from German Application Serial No. 102 36 090.1 filed Aug. 7, 2002.

FIELD OF THE INVENTION

The invention relates to a mobile vehicle comprising a shiftable transmission, which contains at least one friction clutch in the drive train, wherein the friction clutch upon actuation of an inch pedal is caused to slip in a targeted fashion so as to reduce the driving speed of the vehicle.

BACKGROUND OF THE INVENTION

This shiftable transmission is especially necessary in machines, such as wheel loaders or high-lift trucks since in these vehicles low driving speeds are required when picking up loads, however, the operating hydraulic system requires maximum power in this state. For this state, it is necessary to maintain the driving motor at the maximum possible rotational speed in order to drive the hydraulic pump connected thereto at maximum rotational speed and to operate the friction clutch in a slipping manner, in order to reduce the driving speed. For this, the actuating force of the friction clutch can be lowered upon actuation of the inch pedal wherein, in the case of a minimal actuation path of the inch pedal, the actuating force of the friction clutch is reduced only slightly; the actuating force of the friction clutch is then further reduced during the continued actuation path of the inch pedal and beyond a defined actuation path of the inch pedal the service brake of the vehicle is additionally activated to further lower the driving speed. The friction clutch is exposed to the risk of damage in the slipping state, especially when the frictional power exceeds a defined value. This can occur due to incorrect adjustment of the inch pedal and hence erroneous target values.

WO 00/22323 discloses a reversing gearbox that can be shifted under load in which the pressure in the friction clutch is lowered in such a way that by actuating a hydraulic inch valve said clutch changes into a defined slippage state. Especially hydraulic inch valves are very complex to adjust which, in conjunction with the hysteresis of said hydraulic valve, leads to erroneous target values, and damage of the friction clutch.

DE 198 30 950 A1 discloses a method and a device for actuating a motor vehicle clutch device in which a pedal position is used to generate appropriate voltage via a rotational angle sensor on the clutch pedal or on a separate inch pedal with said voltage being processed in an electric control unit. By way of an inch pedal line, this voltage is converted into the inch effect, which is between 0% and 100%. Thus it is possible to cause the desired slippage for the reversing clutch. In order to protect the clutch from damage, the speed differential of the clutch device is modulated by varying the gear ratio in the inch operation. However, this is only possible with continuously variable gear units and cannot be employed in powershift transmissions with fixed gear ratio steps.

It is the object of the present invention to create a mobile vehicle comprising a shiftable transmission with fixed gear ratio steps and a friction clutch in which the friction clutch is brought into the slipping state in a targeted fashion and in which the friction clutch is protected from damage.

SUMMARY OF THE INVENTION

A distance sensor is connected to the inch pedal, according to the invention, and supplies an electric signal to an electric control as a function of the pedal path, said control converting the signal into an inch pedal characteristic line, which is between 0% and 100%. 100% inch effect here means a disengaged friction clutch and 0% inch effect means an engaged friction clutch. The electric signal is preferably voltage, which can be generated by a rotational angle sensor on the inch pedal. In order to avoid a complex adjustment of the distance sensor on the inch pedal, it suffices to mount the distance sensor on the inch pedal in such a way that the displacement path of the inch pedal is located within the displacement path of the distance sensor. In order to be able to attribute the starting and ending signals of the distance sensor in the electric control unit, the distance sensor is preferably adjusted electronically when first starting up the vehicle. For this, the adjusting process is started via the electronic control unit, thereafter the inch pedal is completely pushed down and is then returned slowly into the starting position. When moving the inch pedal back slowly, the valued supplied by the distance sensor are preferably also measured in order to exclude possible incorrect signals, e.g., caused by loose gears. The final positions of the inch pedal are then allocated in the electronic control unit to the characteristic line 0% and 100% inch effect. This eliminates mechanical adjustment of the distance sensor entirely. Thus it is no longer possible that the friction clutch can be damaged by incorrect adjustment of the distance sensor.

In another embodiment of the invention, the above-described system can be used to easily attribute the maximum inch effect and, hence, the minimal actuating force of the clutch at which the clutch disks are just starting to slip to a defined actuating state of the service brake. By arranging the distance sensor for the inch function and the distance sensor for the service brake on one inch pedal and by using solely the inch function in a first path area and adding the service brake beyond a defined path area on the inch pedal, it is necessary to be able to allocate the pedal path exactly to the "inching" and "service brake" functions in the electronic control unit. Additionally, there is the problem that the point at which the service brake is activated can differ, depending on the customer's preferences. Erroneous settings may cause damage to the clutch.

In the arrangement of the distance sensor, according to the invention, a simple adjustment and setting of the service brake to the inching function is possible. For this purpose, the vehicle is moved on an almost horizontal terrain. The adjusting process is started and preferably a display prompts the operator to perform further actions. After the driving motor speed has been adjusted to a defined value, preferably the maximum rotational speed and the service brake has been actuated, the process is started. By slowly releasing the service brake, the vehicle is set in motion. During this adjusting process, the clutch force remains constantly adjusted within the inch effect 0% to 100%. By pushing the inch pedal further down, the service brake is activated and, hence, the vehicle is slowed down. By measuring the vehicle motion, the braking time is known from the pedal path of the inch pedal and is stored in the electronic control unit. The maximum inch effect, 100%, at which the disks of the friction brake just come into contact and which corresponds to a minimal actuating force of the clutch, is stored in the electronic control unit as a function of the pedal path and can then be determined as described for example in WO 01/65227 A1 or in DE 198 26 097 A1. Since now the electronic control unit has information about the minimal actuating force of the friction force and, hence, about the point 100% inch effect with the corresponding inch pedal position; the inch pedal position at which the service brake is activated, the service brake can now be programmed and thus set, by establishing the characteristic lines of the intersecting points of the inch pressure with the braking pressure.

In a further embodiment, the minimal decrease in the actuating force of the friction clutch is limited in such a way that the friction clutch during the onset of inching and, hence, an inch effect greater than 0%, is not damaged even during extended operation of the clutch in the slipping state. Thus, during the onset of inching, the actuating force of the clutch is reduced from the full actuating force to this defined actuating force, i.e., onset of inching. When pushing the inch pedal down further, the actuating force is lowered further, however, this only further reduces also the frictional power and the friction clutch cannot be damaged.

In a further embodiment of the invention, the electronic control unit detects whether the inch pedal is moved in the "more inching" direction or whether the inch pedal is moved in the "less inching" direction. Since the inch function is preferably used in machines that can be operated also on uneven terrain, it cannot be excluded that the driver performs unintended movements on the inch pedal due to the uneven terrain. To ensure that the actuating force of the friction clutch does not change due to unintended movements of the inch pedal, a filtration process is incorporated when changing the "more inching" function, therefore, a lower actuating force of the friction clutch and the "less inching" function, thus, a higher actuating force of the friction clutch so that the "more inching" function switches to the "less inching" function only at a preset pedal path of the inch pedal. This preset minimum path, likewise, exists in the opposite direction.

In a further embodiment of the invention, especially in the case of hydraulic actuating devices of the friction clutch, different characteristic lines are used for the actuating pressure of the actuating device for the "more inching" functions, therefore, less actuating pressure, and the "less inching" functions, accordingly more actuating pressure. By using different characteristic lines for these two functions, the hysteresis, which exists in the mechanical-hydraulic drive and actuation of the friction clutch, and especially when switching from less actuating pressure to more actuating pressure and switching in the opposite direction, can have no negative effects. By eliminating said hysteresis through the use of different characteristic lines for the actuating directions, an immediate change in the transmitted torque can be detected when changing the inch pedal path and the pedal direction.

In another embodiment of the invention, the transition of these two characteristic lines is performed continuously when changing the direction of motion of the inch pedal, thus eliminating any jerky shifting in the vehicle. In another embodiment of the invention, the change in the actuating force is limited above a defined actuating speed of the inch pedal, in order to prevent undesirable and unintended shifting jolts, e.g., due to slippage from the inch pedal, therefore, the immediate return of the inch pedal. The change in the actuating force occurs continuously in such cases.

In another embodiment of the invention, the transition is effected via the engaged clutch, accordingly the clutch with the maximum actuating force, to the onset of inching and, therefore, the minimal inch effect occurs continuously, thus improving the driving behavior and minimizing the load of the friction clutch. Likewise, the transition in the opposite direction occurs continuously.

In another embodiment of the invention, the frictional power is calculated continuously from the time, the speed differential of the clutch and the actuating force of the clutch and, when a previously defined, permissible frictional power is exceeded, the actuating force of the clutch is lowered, which can occur, for example, by lowering the clutch pressure, protecting the clutch from damage. Hence in a simple fashion, it is possible to use the "inching" function in the vehicle to adjust the distance sensor, to exclude erroneous actuation of the inch pedal, to prevent shifting jolts and damage to the clutch and thus to ensure reliable operation in the vehicle.

BRIEF DESCRIPTION OF THE DRAWINGS

The invention will now be described, by way of example, with reference to the accompanying drawing in which.

DETAILED DESCRIPTION OF THE INVENTION

Figure 1:
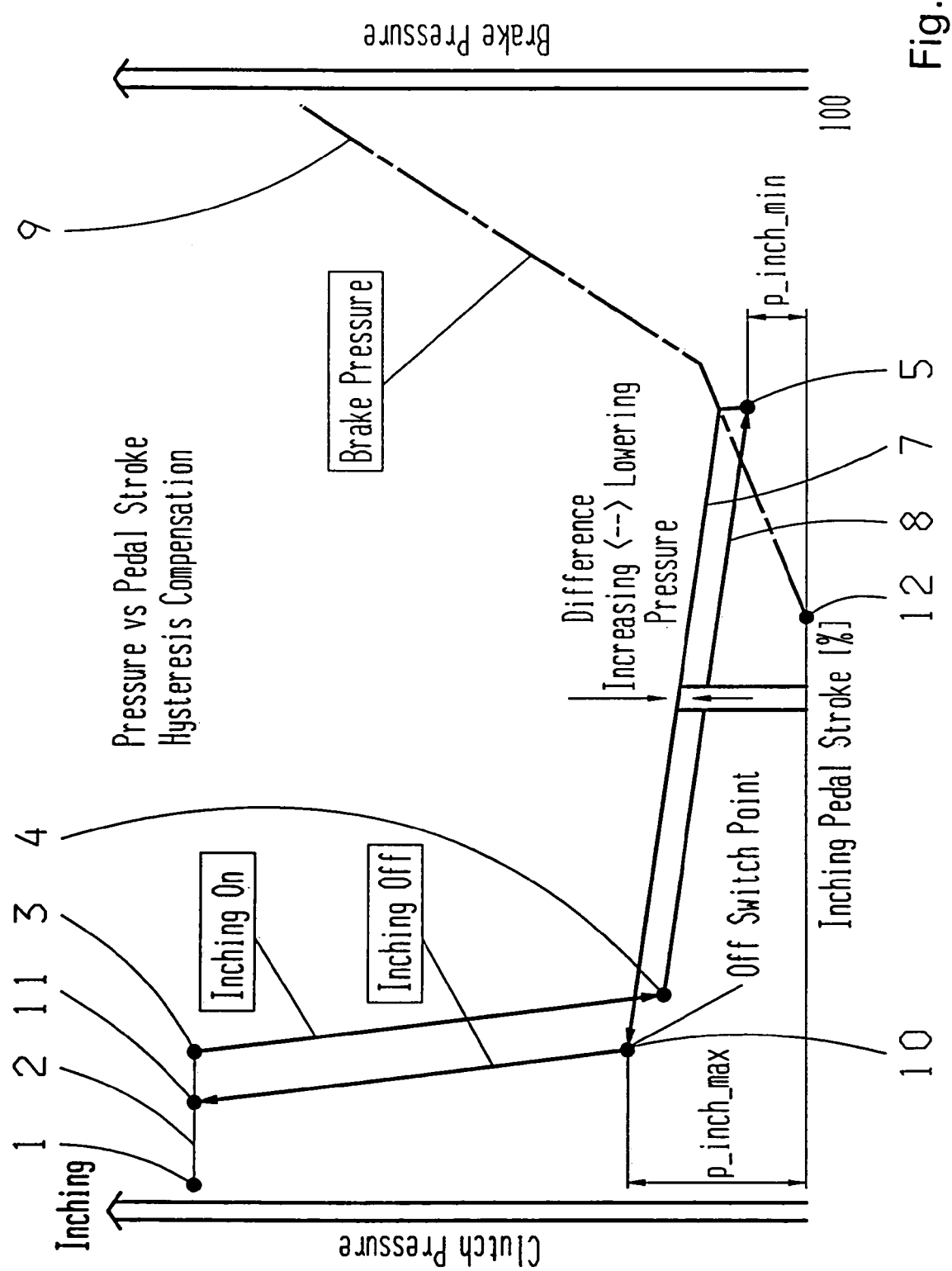
FIG. 1 shows the course of an inch process across the pedal path of the inch pedal.
Figure 2:
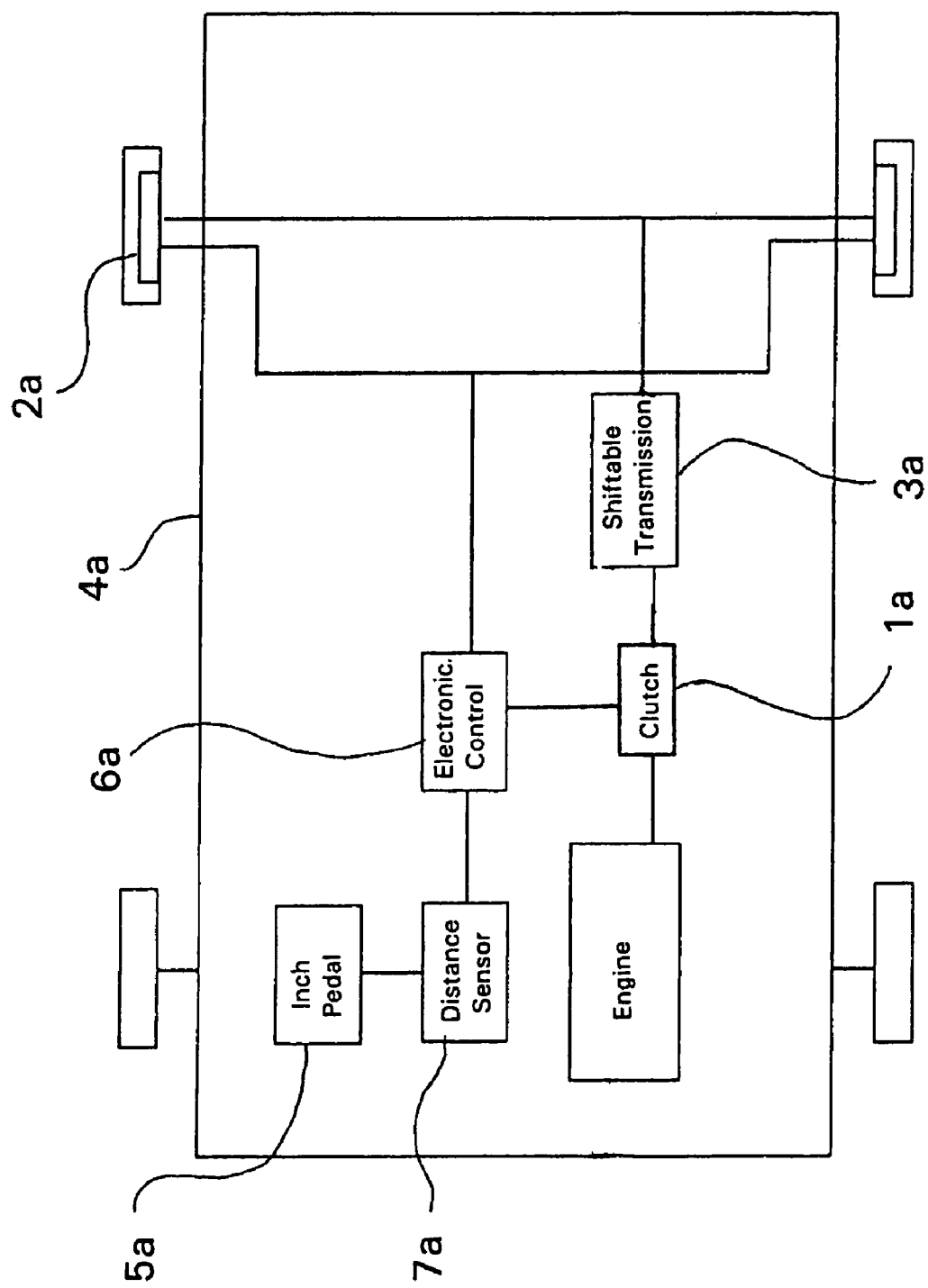
FIG. 2 is a diagrammatic drawing showing the various components included in the mobile vehicle.

The diagrams are shown for a hydraulically actuated multi-disk clutch 1a and a hydraulically actuated service brake 2a for a shiftable transmission 3a in a mobile vehicle 4a. The multi-disk clutch 1a and the service brake 2a are actuated by way of a hydraulic pressure in the engaging sense. The pressure for the hydraulic clutch 1a and the hydraulic brake 2a is illustrated on the ordinate, the pedal path of an inch pedal 5a on the abscissa. When the inch pedal 5a is in its starting position 1, maximum pressure is applied to the friction clutch 1a and hence it is engaged, which can be seen on line 2. The inch pedal 5a is pushed down to an inching starting point 3 without changing the clutch pressure. When the inch pedal 5a is pushed down further than the inching starting point 3, the clutch pressure is lowered continuously to an inching start 4. The inching start 4 clutch pressure has been previously defined and is dependent upon the power of the clutch 1a at which the vehicle can be operated with a slipping clutch 1a over an extended period of time without damaging the clutch 1a. When pushing the inch pedal 5a down further, the clutch pressure of the friction clutch 1a decreases further until it has reached a minimal clutch pressure 5 at which the disks of the clutch 1a just come into contact. Said clutch pressure can no longer be reduced further by the inch pedal 5a. If now the inch pedal 5a is moved back in the opposite direction, i.e., in the direction of the starting position 1, then the clutch pressure is immediately raised by a defined value, thus maintaining the clutch actuating force, but causing the actuating device to actuate the clutch 1a immediately in an engaging sense when increasing the clutch force further due to a movement of the inch pedal 1a in the direction of the starting position since the hysteresis is compensated by the use of an engaging characteristic line 7 due to the actuation of the components. By means of inching in the engaging sense on the engaging characteristic line 7 and in the disengaging sense on a disengaging characteristic line 6, the hysteresis of the components is eliminated, thus passing on immediate responsive behavior of the inch function to the driver. Erroneous operation by the driver, due to an inch pedal 5a that has been pushed down or released too far, therefore, is eliminated. When the inch pedal 5a reaches a motion point 8, the service brake is also activated, which can be seen from line 9. When the engaging characteristic line 7 reaches a point 10, which is, likewise, defined such that the friction clutch is not damaged during extended operation and the inch pedal 5a is moved further in the direction of the starting position 1, the clutch pressure is increased continuously up to the maximum clutch pressure thus completely engaging the clutch 1a. When the clutch 1a is operated for an impermissibly long time in a slipping state, the clutch 1a is automatically actuated in the disengaging sense. The inch pedal 5a must be pushed down further to start the inch process than when leaving the inch process. The difference between the inching starting point 3 and an inching end point 11 causes a brief erroneous operation of the gas pedal to have no negative effect when driving on uneven terrain. Through the electronic adjustment of a distance sensor 7a and the detection of a starting point 12 of the service brake 2a, it is possible to adjust the inch function as desired with the characteristic line of the service brake 9 in an electronic control system 6a, thus activating the service brake earlier or later depending on the programming.

REFERENCE NUMERALS 1 starting position
2 line
3 inching starting point
4 onset of inching
5 minimal clutch pressure
6 disengaging characteristic line
7 engaging characteristic line
8 motion point
9 line
10 point
11 inching end point
12 starting point

The invention claimed is:

1. A mobile vehicle comprising:
 a shiftable transmission with fixed gear ratio steps, which contains a friction clutch that can be engaged by an actuating force,
 an inch pedal, a pedal path of which is detected by a distance sensor, and supplied to an electronic control unit, upon actuation of the inch pedal, the electronic control unit lowers the actuating force of the friction clutch as a function of the pedal path and then brings the friction clutch into a slipping state,
 a starting position and an end position of the inch pedal are detected by the electronic control device, and allocated to an inch characteristic line, wherein:
 at vehicle start-up the starting position and the end position of the inch pedal are allocated in the electronic control unit to the characteristic line of a 0% and 100% inch effect to eliminate mechanical adjustment of the distance sensor.

2. The mobile vehicle comprising a shiftable transmission according to claim 1, wherein the inch characteristic line has an inch effect of 0% to 100%.

3. The mobile vehicle comprising a shiftable transmission according to claim 1, wherein an intersecting point of the inch characteristic line to a service brake characteristic line can be adjusted.

4. The mobile vehicle comprising a shiftable transmission according to claim 1, wherein the electronic control unit detects the inch pedal path, at which a service brake is activated, by which the vehicle is delayed, a braking time is determined by measuring a motion change of the vehicle, and stored in the electronic control unit.

5. The mobile vehicle comprising a shiftable transmission according to claim 1, wherein the pedal path of the inch pedal is located within a motion path of the distance sensor.

6. A mobile vehicle comprising:
 a shiftable transmission with fixed gear ratio steps, which contains a friction clutch that can be engaged by an actuating force,
 an inch pedal, a pedal path of which is detected by a distance sensor, and supplied to an electronic control unit, upon actuation of the inch pedal, the electronic control unit lowers the actuating force of the friction clutch as a function of the pedal path and then brings the friction clutch into a slipping state,
 a starting position and an end position of the inch pedal are detected by the electronic control device, and allocated to an inch characteristic line,
 at vehicle start-up the starting position and the end position of the inch pedal are allocated in the electronic control unit to the characteristic line of a 0% and 100% inch effect to eliminate mechanical adjustment of the distance sensor; and
 wherein the electronic control unit determines the function of the pedal path at which a service brake is activated and the vehicle is braked, a braking time is determined by measuring a motion change of the vehicle and stored in the electronic control unit.

\* \* \* \* \*